United States Patent [19]

Shimizu et al.

[11] Patent Number: 5,373,332
[45] Date of Patent: Dec. 13, 1994

[54] PLASTIC SPECTACLE LENS AND METHOD FOR MAKING

[75] Inventors: Toshihiko Shimizu; Mitsusada Ito, both of Suwa, Japan

[73] Assignee: Seiko Epson Corporation, Tokyo, Japan

[21] Appl. No.: 871,303

[22] Filed: Apr. 20, 1992

[30] Foreign Application Priority Data

Apr. 25, 1991 [JP] Japan .................................. 3-95758

[51] Int. Cl.⁵ .............................................. G02C 7/02
[52] U.S. Cl. ...................................... 351/159; 351/177
[58] Field of Search ................. 351/159, 177, 176, 169

[56] References Cited

U.S. PATENT DOCUMENTS 4,619,504 10/1986 Daniels et al. .................. 351/159 X

OTHER PUBLICATIONS

Horne, D. F.; *Spectacle Lens Technology*; Crane Russak and Company, Inc; New York; 1978; p. 118.

*Primary Examiner*—Scott J. Sugarman
*Attorney, Agent, or Firm*—Ladas & Parry

[57] ABSTRACT

A plastic spectacle lens includes a protuberance portion intergrally formed with a peripheral portion of one of the concave and convex sides thereof for indicating information thereof. Indication of the class and the power of the lens in the protuberance portion facilitates determination of specifications of the lens.

9 Claims, 2 Drawing Sheets

PLASTIC SPECTACLE LENS AND METHOD FOR MAKING

BACKGROUND OF THE INVENTION

The present invention relates to a plastic spectacle lens for sight curing.

Before being machined for fitting to spectacle frames, plastic spectacle lenses are generally circular, and particular directions such as a principal meridian are not determined yet. According to specific operations, specification of directivity of each of lenses, such as the direction of the principal meridian, becomes necessary. In practice, the direction, such as direction of the principal meridian, of each lens must be specified in the following events: for example, determination of the power and the astigmatism axis of the lens; half coloring to color a half of the lens; and fitting of the lens to a spectacle frame in a correct direction.

In progressive power multi-focus lens, it is preferable to previously indicate information of the classification thereof on the lens surface. There may be a case where lenses of a specific characteristic are taken out from many lenses having different characteristics.

In spite of such needs, blanks of conventional plastic spectacle lenses have no indicia to indicate directional instructions, a class and a power. To determine the direction of a lens, an instrument, such as a lens meter, must be used. Alternatively, each lens is accompanied with an instruction slip indicating a directivity, a classification and a power thereof, and production of the lens must be done referring to the instruction slip. This deteriorates productivity of spectacles. Moreover in case of losing an instruction slip, it is hard to quickly know the information of the lens.

SUMMARY OF THE INVENTION

Accordingly, it is an object of the present invention to provide a plastic spectacle lens which overcomes the previously described disadvantages of the prior art.

It is another object of the present invention to provide a plastic spectacle lens of which characteristics, such as a directivity, a class and a power, are learned with ease.

In view of these and other objects, the present invention provides a plastic spectacle lens of the type which includes concave and convex sides each having a peripheral portion, comprising a protuberance portion, integrally formed in the peripheral portion of one of the concave and convex sides, for indicating information of the lens.

According to the present invention, plastic spectacle lens has information indicating protuberance portion integrally formed with a peripheral portion of one of the concave and convex sides thereof. Thus, characteristics, such as a direction of the meridian, a class and a power, of the lens may be given with ease for machining of the plastic spectacle lens and fitting of the latter to a spectacle frame, and this considerably enhances productivity of the lens.

DETAILED DESCRIPTION OF THE PREFERRED EMBODIMENTS

Figure 1:
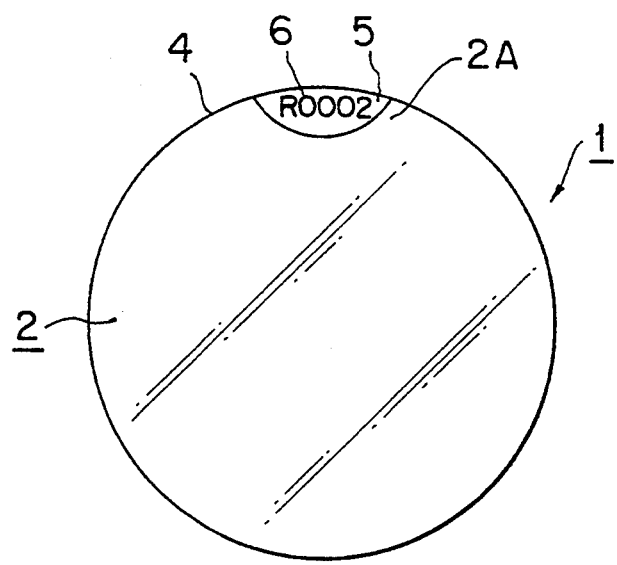
FIG. 1 is a front view of a plastic spectacle lens as one embodiment of the present invention.
Figure 2:
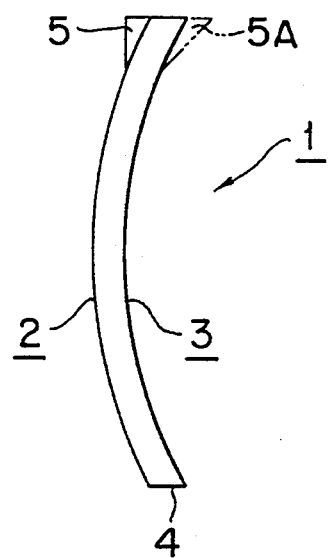
FIG. 2 is a side view of the plastic spectacle lens of FIG. 1.

Referring to FIGS. 1 and 2, the reference numeral 1 generally designates plastic spectacle lens which includes a convex outer spherical surface 2, a concave inner spherical surface 3, and a peripheral edge 4 which defines cylindrical surface. In this embodiment, an indication protuberance or swelling 5 is integrally formed with a peripheral portion 2A of the outer spherical surface 2 of the lens by injection molding. The indication protuberance 5 is formed at a position where a principal meridian 7 intersects the peripheral edge 4 at the upper end thereof.

The indication protuberance 5 is not limited to the position shown in FIG. 1 but may be formed at a portion where the principal meridian 7 intersects the peripheral edge 4 at the lower end thereof. Lens frames are short in the vertical direction as compared to the horizontal direction, and hence it is preferable to form the indication protuberance 5 at an upper or lower periphery of each of lenses. The protuberance may be provided to the inner spherical surface 3 as shown at 5A by a dot-and-dash line.

An indicia 6 of some characteristics, such as a class and a power, of the lens 1 is provided in the surface the indication protuberance 5. In FIG. 1, a code "R0002" is indicated as the indicia 6. Necessary information of the lens, such as trademark and lens for short-sightedness, astigmatism, long-sightedness, right eye, or left eye, is given. As a power, a base power, cylinder power or an astigmatism axis may be used. Other pieces of information may be given.

According to the present invention, characteristics of the lens are known with ease by referring to the indicia 6 of the indication protuberance 5. In each step of machining of the plastic spectacle lens and fitting of the plastic spectacle lens to a spectacle frame, the operation is therefore correctly performed, and the productivity of the lens is considerably enhanced.

Figure 3:
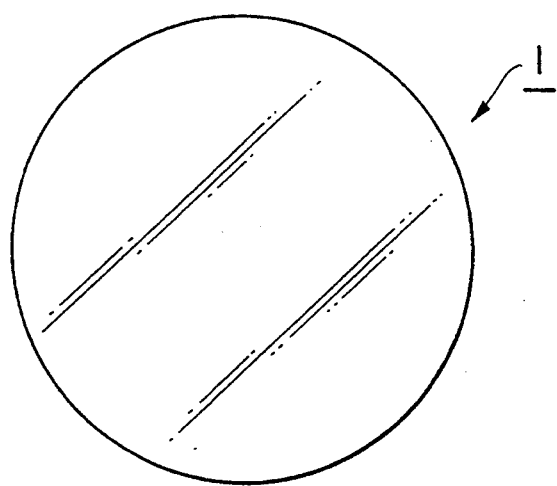
FIG. 3 is a front view of a typical example of the conventional plastic spectacle lens.
Figure 4:
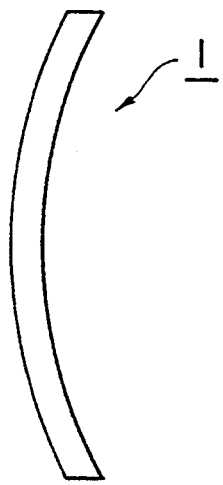
FIG. 4 is a side view of the plastic spectacle lens of FIG. 3.

FIGS. 3 and 4 illustrate a typical example of the conventional plastic spectacle lens. Such a lens has no protuberance and therefore cannot achieve the advantageous effects of the present invention.

What is claimed is:

1. A plastic spectacle lens which includes concave and convex sides each having a peripheral portion, said lens comprising a protuberance, integrally formed in the peripheral portion of one of the concave and convex sides, for inscribing alphanumeric symbols, said protuberance being formed in a portion of said one side where the peripheral portion of said one side intersects a principal meridian of the lens, said protuberance comprising a plurality of protuberance portions which protrude varying distances from said one side whereby at least one of said protuberance portions protrudes from said side a greater distance than another of said protuberance portions.

2. A plastic spectacle lens as recited in claim 1, wherein the protuberance is formed on the convex side.

3. A plastic spectacle lens as recited in claim 1, wherein the protuberance is formed on the concave side.

4. A plastic spectacle lens as claimed in claim 1 wherein the peripheral portion of said one side has a peripheral edge, said at least one protuberance portion being proximal to said peripheral edge.

5. A plastic spectacle lens as claimed in claim 4 wherein the protuberance protrudes from said one side a distance which increases gradually, with the distance being greatest at the at least one protuberance portion proximal to said peripheral edge.

6. In a method for making a plastic spectacle lens having a principal meridian and having a generally spherical concave inner surface with a first peripheral portion and a generally spherical convex outer surface with a second peripheral portion, the improvement comprising a) forming the lens so that said first or second peripheral portion comprises a protuberance which is formed integrally with and protrudes from either said outer surface or said inner surface and provides a raised surface for the inscription of alphanumeric symbols, and b) inscribing alphanumeric symbols on said raised surface.

7. A method as claimed in claim 6, wherein the protuberance is integrally formed on said inner surface.

8. A method as claimed in claim 6, wherein the protuberance is integrally formed on said outer surface.

9. A method as claimed in claim 6, wherein the protuberance is integrally formed-with said inner or outer surface by injection molding.

* * * * *